United States Patent [19]

Cohen et al.

[11] Patent Number: 4,736,359
[45] Date of Patent: Apr. 5, 1988

[54] SINGLE FIBER OPTICAL COMMUNICATION SYSTEM

[75] Inventors: Stuart B. Cohen, Cedar Grove; Robert Goeb, Spotswood; Ernest J. Oliveira, Livingston, all of N.J.

[73] Assignee: ITT Defense Communications, a division of ITT Corporation, Nutley, N.J.

[21] Appl. No.: 860,374

[22] Filed: May 6, 1986

[51] Int. Cl.$^4$ .............................................. H04B 9/00
[52] U.S. Cl. .................................. 370/3; 455/612; 455/617
[58] Field of Search ............... 370/1, 2, 3; 455/612, 455/617, 619; 350/96.15, 96.16, 96.19

[56] References Cited

U.S. PATENT DOCUMENTS 4,551,829  11/1983  Dragoo et al. ........................ 370/3

FOREIGN PATENT DOCUMENTS 55-120241  9/1980  Japan ..................................... 370/3
2011611    7/1979  United Kingdom ................. 455/617

OTHER PUBLICATIONS

Owen—"Pin-GaAs FET Optical Receiver"—Electronics Letters-Jul. 8, 1982, vol. 18, #14, pp. 626-627.

*Primary Examiner*—Joseph A. Orsino
*Attorney, Agent, or Firm*—Robert A. Walsh; Thomas N. Twomey; Mary C. Werner

[57] ABSTRACT

A single fiber optical communication system (SFOCS) allows, in many operational scenarios, one-person deployment and recovery of optical links. Wavelength division multiplexing (WDM) is employed to provide full-duplex, bi-directional transmission. An optical subsystem achieves the wavelength multiplexing and demultiplexing while at the same time allowing for an unpolarized terminal design. Selection by the system of the WDM operating wavelengths between a pair of SFOCS terminals is performed without operator intervention.

7 Claims, 13 Drawing Sheets

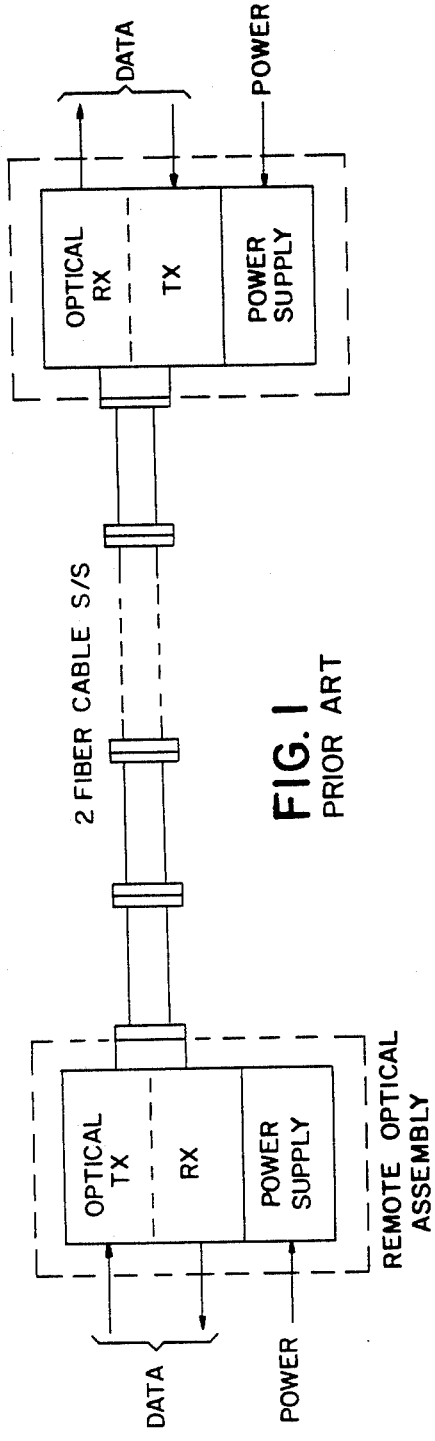
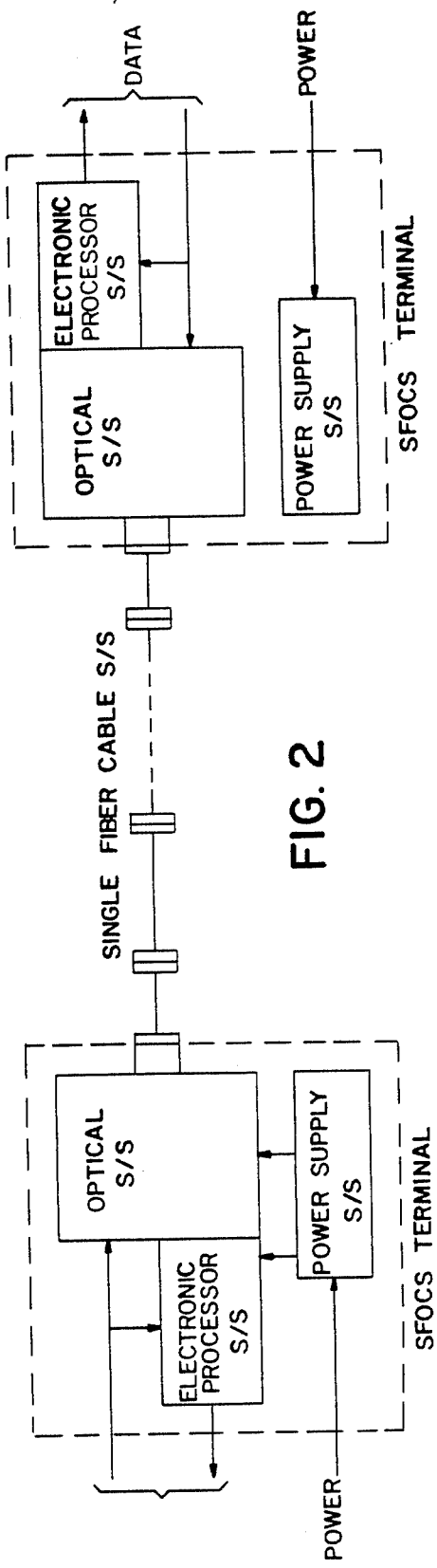

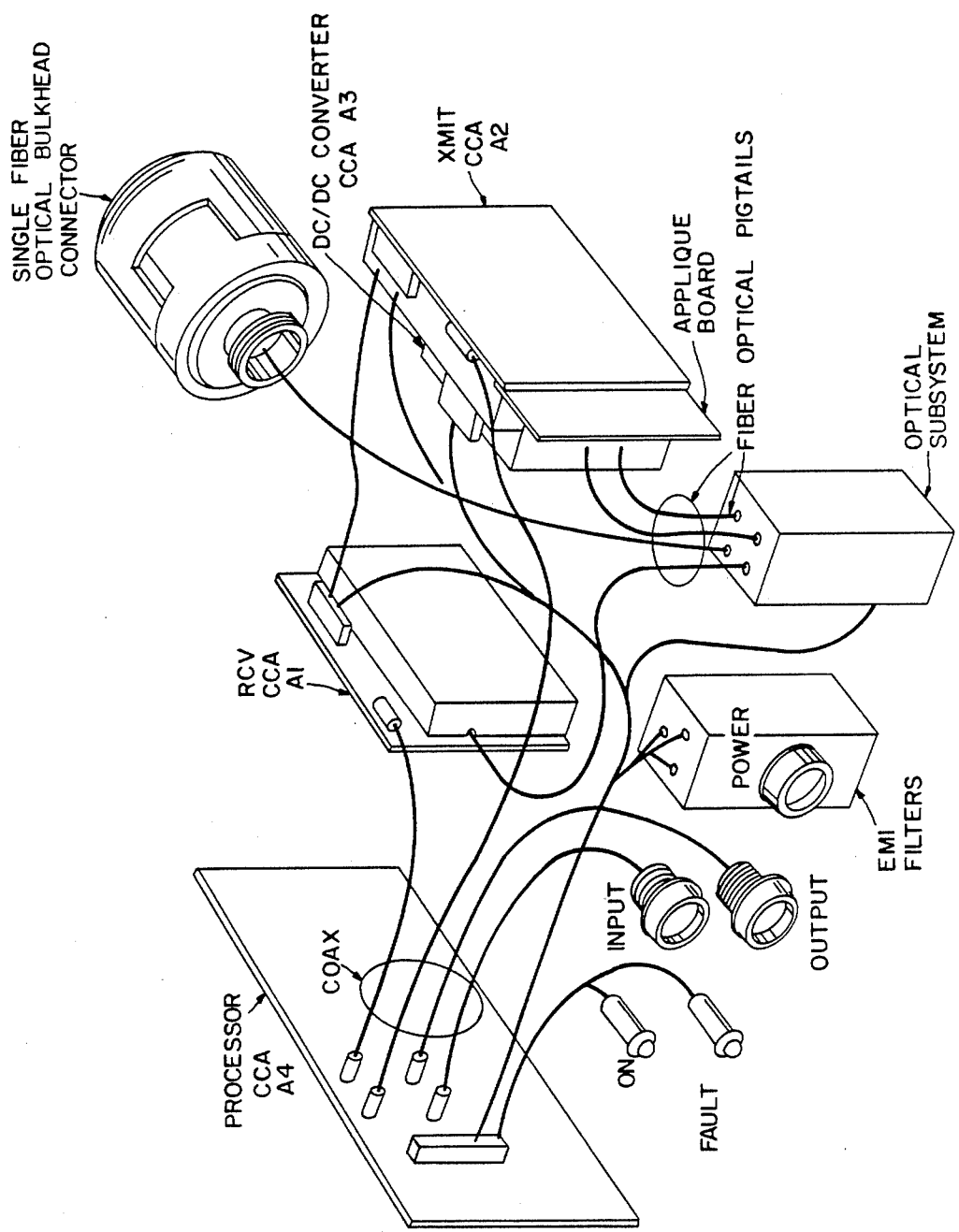

SINGLE FIBER OPTICAL COMMUNICATION SYSTEM

The Government has rights in this invention pursuant to Contract No. F30602-84-C-0010 awarded by the Air Force Systems Command, Rome Air Development Center.

The invention relates to an optical fiber communication system.

Highly mobile, dependable, and survivable communications systems in tactical environments may employ fiber optics in the communications architecture to provide a lightweight, wide bandwidth, high data rate transmission media replacement for metallic cable systems. Fiber optic cable systems provide significant benefits: volume and weight reduction; lower cost with higher maintainability; no detectable radiation of RF or other signatures; low susceptibility to disruption or damage by nuclear-induced electromagnetic pulse (EMP); and increased link length and bandwidth. The use of dual fiber optical cable transmission systems as replacements for conventional CX-11230 cables or with appropriate multiplexers as replacements for multi-pair CX-4566 cables provides a considerable increase in unrepeatered link distances, as well as a reduction in size and weight. However, while dual fiber optical cable systems may be employed to reduce the cable volume and weight of tactical point-to-point communications on a per unit basis, the larger link distance allowed by fiber optics (from less than 500 meters using CX-4566 cable to 8 kilometers using fiber optics) means that the dual fiber optical cable system may still be too heavy and require too much volume for convenience in new tactical, mobile, field-deployable systems.

A single fiber optical communication system (SFOCS) according to the invention provides substantial size and weight savings to allow, in many operational scenarios, one-person deployment and recovery of optical links.

The invention may be better understood from a reading of the following detailed description in conjunction with the drawings in which:

FIG. 1 shows a block diagram of a known dual fiber optical communication system.

FIG. 2 shows a block diagram of a single fiber optical communication system (SFOCS) according to the invention.

FIG. 9 is the SFOCS terminal interconnect diagram which shows the relationship between the SFOCS assemblies and connectors according to the invention.

FIG. 10 shows the SFOCS executive routine flowchart.

FIG. 11 shows the power-on reset routine flowchart.

FIG. 12 shows the timer routine flowchart.

FIG. 13 shows the fault-check routine flowchart.

FIG. 14 shows the fault priority routine flowchart.

FIG. 15 shows the microprocessor self-test routine flowchart.

It is known to provide a two-fiber system, as shown in FIG. 1. A system according to the invention replaces the two-fiber cable with a single fiber cable, as shown in FIG. 2.

A system according to the invention is comprised of a combination of four subsystems: a single fiber optical cable assembly (SFOCA); an optical subsystem; an electronic processor subsystem; and an SFOCS terminal. A complete communication system employing the invention would comprise two SFOCS terminals connected by one or more SFOCS cable assemblies.

Figure 3:
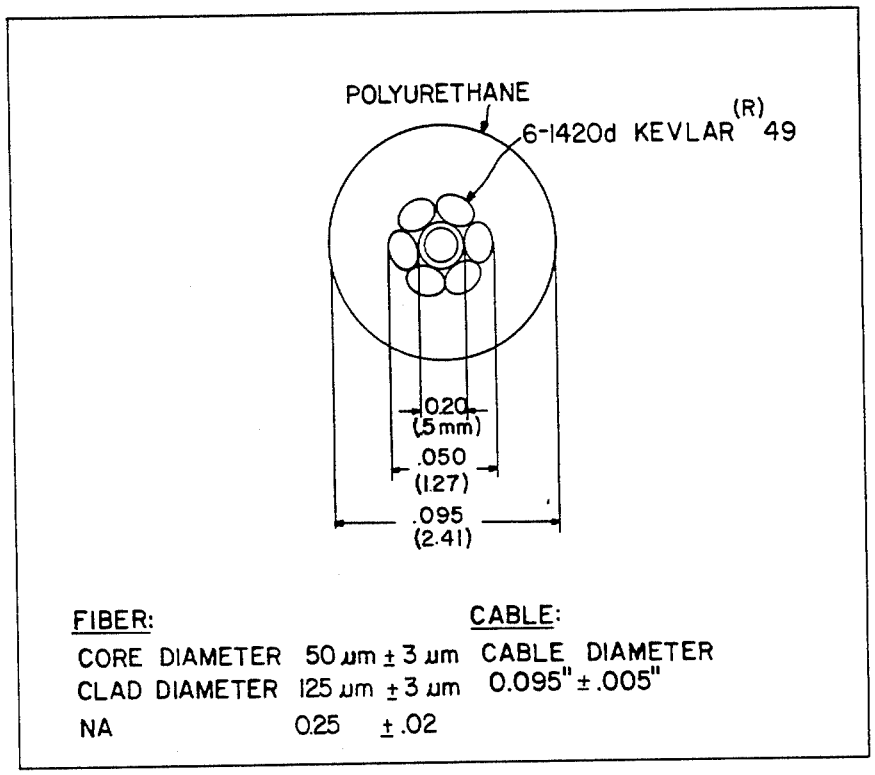
FIG. 3 shows a cross section of the cable of the SFOCS cable assembly.

A cross section of the cable of the SFOCS cable assembly is shown in FIG. 3. A plurality of assemblies may be connected. For examples, eight assemblies, each 1 kilometer in length, may be connected to form an 8-kilometer optic link. Each end of an assembly is terminated in a single optical fiber hermaphroditic connector half, with the connector/cable retention strength equal to 45 pounds force (200 newtons). The characteristics of the exemplary optical fiber include a 0.25 numerical aperture and a core/cladding diameter of 50/125 microns. Attenuation of this optical fiber is shown in FIG. 4.

Wavelength division multiplexing (WDM) is employed to provide full-duplex, bi-directional transmission. An optical subsystem, according to the invention, achieves the wavelength multiplexing and demultiplexing while at the same time allowing for an unpolarized terminal design; that is, each terminal may be identical in design. Additionally, selection of the WDM operating wavelengths between a pair of SFOCS terminals is performed automatically; that is, without operator intervention, by a system according to the invention.

Figure 4:
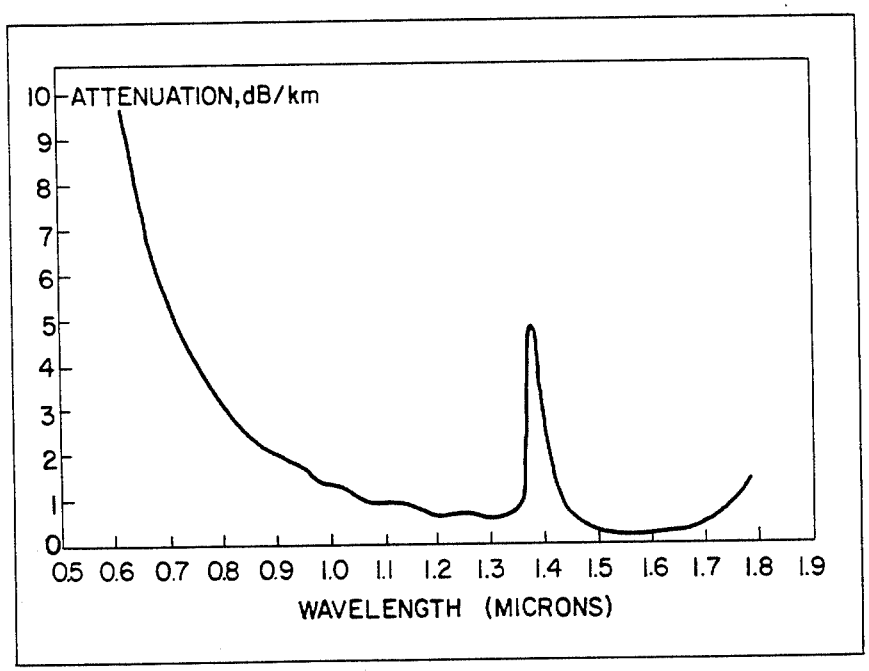
FIG. 4 shows attenuation of the optical fiber of the cable of FIG. 3.

The attenuation curve of FIG. 4 illustrates that, with the exception of an attenuation peak of five decibels/-kilometer (db/km) at the 1.4 micron wavelength (caused by the OH$^-$ contamination of the silica-based fiber), attenuation is less than two dB/km over the range from 1.1 to 1.7 microns.

The single optical fiber is surrounded by six strands of Kevlar™ 49 to provide tensile strength in excess of 150 pounds force (673 newtons). The cladded cable is sheathed in polyuyethane to provide protection against the environment.

Actual cable losses, for three temperatures covering the system operating range, are shown in Table 1. The two wavelengths given are those selected for the optical transmission of data.

Wound on an 11¼ inch diameter by 7 inch wide acrylonitrile-butadiene-styrene spool, the weight of a one km cable reeled assembly is only 18 pounds. On this spool, the one km cable easily can be wound in the field.

Figure 5:
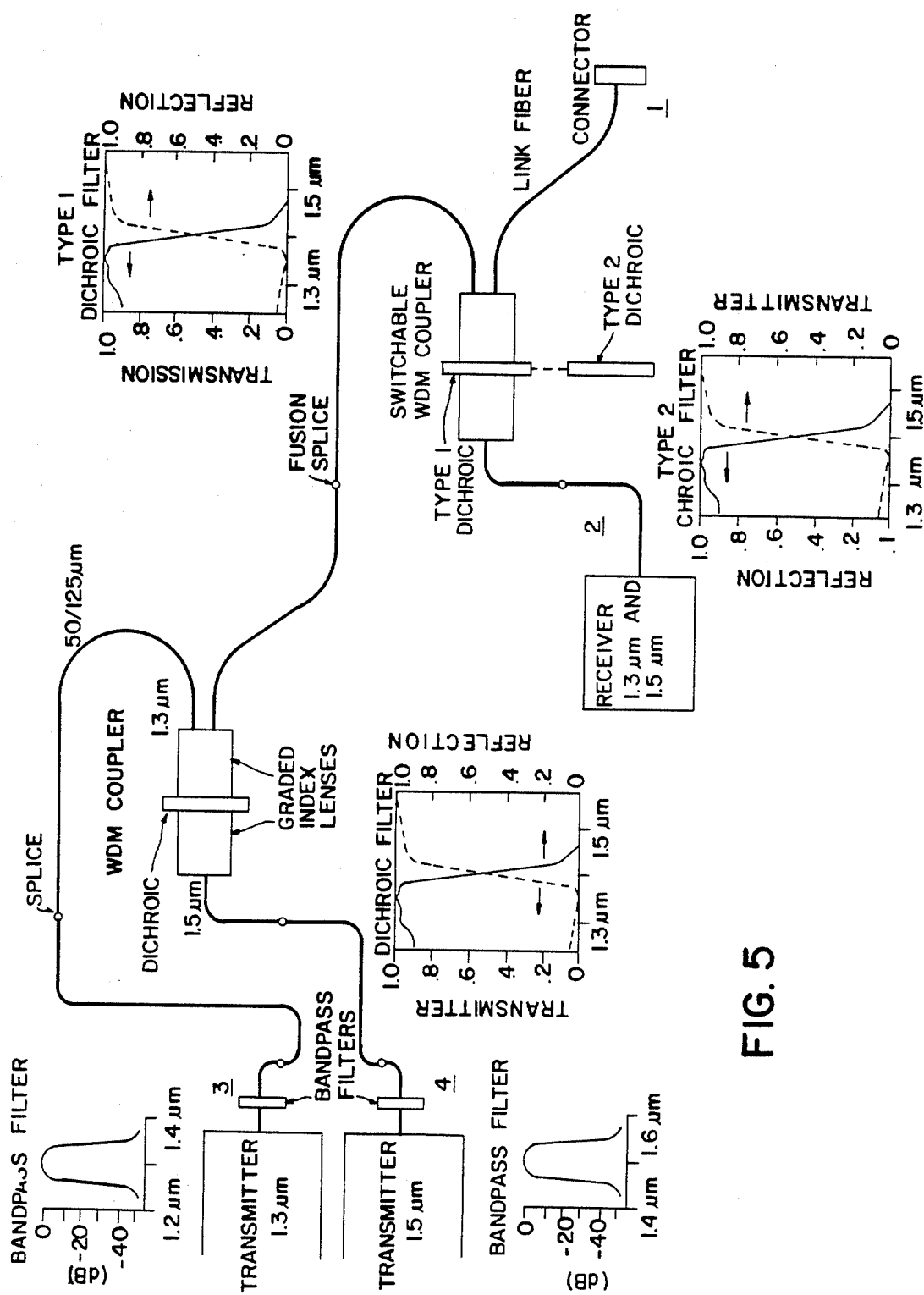
FIG. 5 shows the SFOCS optical subsystem according to the invention.

The SFOCS optical subsystem, shown in FIG. 5, performs wavelength selection for transmitting and receiving optical signals onto the SFOCS single fiber link. The optical transmission wavelengths are nominally 1.3 microns (1.25 actual) and 1.5 microns.

Each of the two transmitters feeds radiation from an electro-optical transmitting device, for example, the infrared radiation of a light emitting diode (LED), through a bandpass filter to ensure that the wavelengths that could encroach onto the emission characteristics of the other LED are eliminated. The two LEDs, each operating in its own wavelength channel, are connected to the subsystem at ports 3 and 4 through optical fiber pigtails. These pigtails are coupled to a transmit WDM coupler which combines both input pigtails into a single output pigtail. The emitted light is transmitted to the transmit WDM coupler where the emissions from both LEDs are guided into the single output fiber by means of a dichroic filter and focused optics, comprised of graded index rod lenses (GRIN lenses). The 1.5 micron light is focused through the dichroic filter, which passes the longer wavelength but reflects the shorter 1.3 micron wavelength, onto the output fiber. The shorter wavelength 1.3 micron light, on the other hand, is focused to reflect off the dichroic filter onto the output fiber port. This arrangement permits a single coupler to feed either of the output lights into the outgoing optical fiber with minimum losses for the transmission wavelengths, and large loss for all other wavelengths.

The outgoing optical fiber leads to a switchable WDM coupler. This coupler provides transmit/receive capability by selectively passing either the shorter or longer wavelength while reflecting the other wavelength. The switchable WDM coupler is comprised of GRIN lenses, an electromechanical switch for movement of two dichroic filters, and has two output optical fibers. One output fiber goes to an electro-optical receiving device, for example, a PIN-FET hybrid detector, at port 2 which is sensitive to light at both wavelengths. The other goes to the tactical hermaphroditic, bulkhead connector at port 3.

The SFOCS optical subsystem, in an operating state, transmits at one selected optical transmission wavelength and receives at the other. The switchable WDM coupler puts one of two dichroic filters between the arriving transmitted and received light and the PIN-FET via control by the SFOCS processor subsystem. Selection of the appropriate dichroic filter in an operating state depends upon which wavelength has been selected for transmission by the SFOCS processor subsystem, which provides the powering of a direct current motor of the electromagnetic switch to drive a rotation shaft causing either dichroic filter to be placed between the coupler GRIN lens assembly. The chosen dichroic filter reflects the transmitted light into the outgoing optical fiber while permitting the incoming received light to pass through to the receiving device, which results in minimum optical power loss as measured from the operational LED fiber pigtail to the bulkhead connector. At the same time, the selected filter provides high optical loss between port 1 and port 2 for wavelength regions which are identical to the selected LED, and minimum optical loss between port 1 and port 2 for the wavelength region opposite to that of the selected LED. Optimum link coupling is thus achieved, as is high optical isolation from backscattered transmitted signals.

Figure 6:
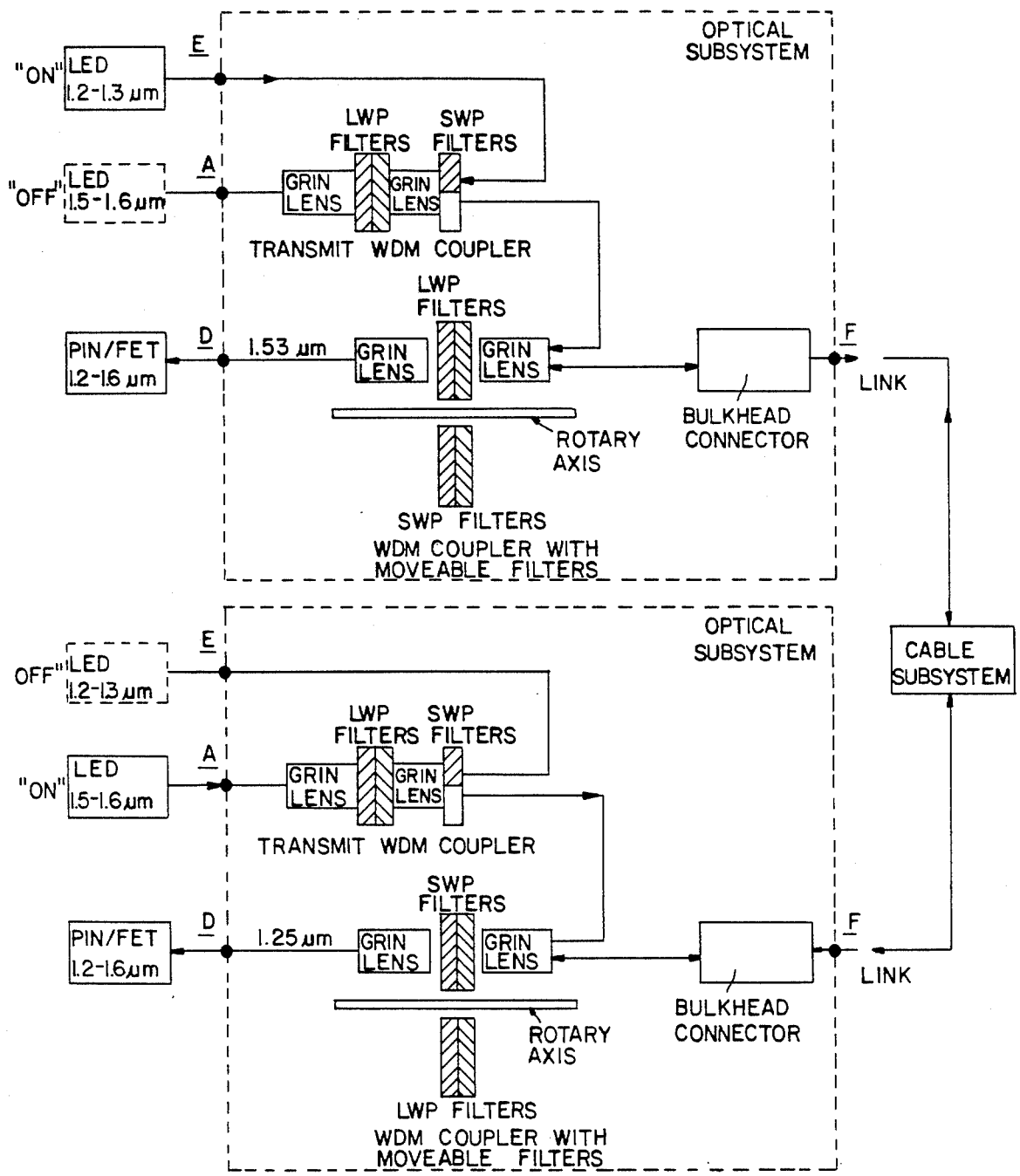
FIG. 6 shows the SFOCS optical subsystems of a two-terminal communication system.

FIG. 6 shows the SFOCS optical subsystems of a two-terminal communication system. In the operating state shown, the upper terminal is transmitting on the short wavelength and receiving on the long wavelength, while the lower terminal is transmitting on the long wavelength and receiving on the short wavelength. Each optical subsystem is connected optically to the SFOCS cable assembly (SFOCA through a bulkhead connector.

The total optical losses and performance of the system is shown in Tables 2 and 3 for three temperatures covering the system operating range. The LEDs and the PIN-FET have higher output powers and greater sensitivity respectively at the lower temperatures. Connector losses are just over one dB per mated pair. Multiplexer loss takes into account the losses through the two WDM couplers in the transmitting optical subassembly and the switchable ADM coupler in the receiving optical subassembly as well as the bandpass filter losses. The splice loss covers the fusion splice in the optical fiber connecting the two WDM couplers of the transmitter.

Splice loss in the optical system receiver path can be substantially eliminated by inserting the detector and LED pigtails directly into the WDM components. Difficulty in replacement of LEDs in the optical subsystem can be minimized by carefully matching fiber parameters. PIN-FET detector replacement may be aided by using detectors supplied with large core fiber pigtails (65 micrometer core/125 micrometer cladding).

Even under worse case conditions (1.5 micron wavelength at +71° F.), sufficient margin exists to ensure that the receiver can detect the transmitted information.

Figure 7:
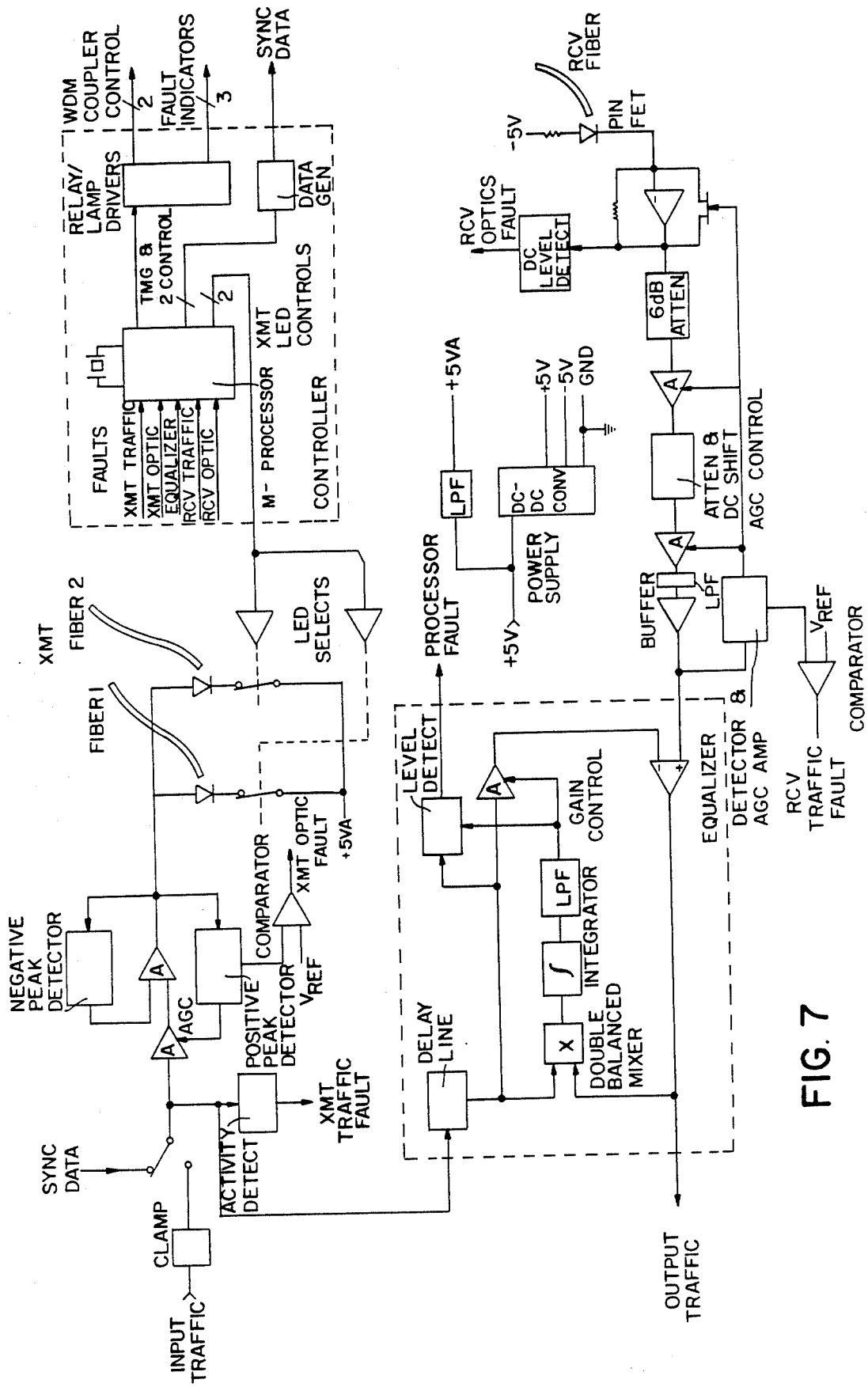
FIG. 7 shows a block diagram of the SFOCS electronic processor subsystem according to the invention.

The SFOCS processor subsystem, shown in FIG. 7, is comprised of a controller/built-in test equipment (BITE) and a canceller, as well as a transmitter, a receiver, and a DC/DC converter, contained in the SFOCS terminal.

The controller/BITE is described below. The controller supplies the following functions:

(1) Control of the switchable WDM coupler to select which dichroic filter is inserted. This choice is determined by whether the transmitter is using the short or long wavelength LED.

(2) Control of LED selection so as to apply the data pulse train to either the long or short wavelength LED for transmission.

(3) Data activity recognition of the incoming signal to the receiver to determine the receipt of data as part of the terminal synchronization process. As soon as the received data is recognized, the processor latches the terminal state (long wavelength transmit/short wavelength receive or vice versa).

(4) Fault status and BITE indication to evaluate the fault status circuits and to turn on the fault and BITE LEDs to indicate the system status to the operator. Two LED indicators are for fault indication, and five LEDs correspond to five specific BITE-determined faults.

(5) Self start to initialize the system without operator intervention.

(6) Input clipping to prevent the input voltage applied to the transmitter from exceeding 1.5 volts.

(7) Wait state operation.

When power is applied to the SFOCS terminal, the SFOCS processor subsystem begins a synchronization routine to establish the transmit/receive wavelengths with the remote SFOCS terminal. The terminal first transmits on the long wavelength (LWL) and receives on the short wavelength (SWL). After staying in this mode for a random time $T_1$, the controller checks to determine whether data is being received from the remote terminal. Data presence is determined by polling the receiver optic fault status. A false status indicates received data activity and terminal synchronization. A true status indicates non-synchronization. If synchronization is not achieved after waiting $T_1$ seconds, the terminal state is reversed to transmit SWL and receive LWL. The terminal remains in this state for a random time $T_2$. If synchronization does not occur, the processor again reverses states. It will alternate states randomly for a predetermined number of state changes.

If synchronization is not achieved during that period, the controller enters a wait state for a predetermined period, for example, five minutes, during which time the transmitter is SWL and the receiver is LWL. At the end of this five minute wait state, the processor again initiates the synchronization routine. While in the wait state, the terminal status is indicated by a flashing red LED located, for example, on a front panel of the SFOCS terminal.

The built-in test equipment (BITE) tests for the following faults:

(1) Transmitter traffic fault when no input data is detected.

(2) Transmitter optical fault when the bias on the transmit LEDs is out of range.

(3) Receiver optical fault when the bias on the receiver automatic gain control (AGC) is out of range.

(4) Receiver traffic fault when the loss of received data is detected.

(5) Equalizer fault when the loss of output data is detected.

Five status LEDs are used to indicate these faults. In addition, two LEDs on the outside of the terminal show whether a fault has occurred. A red LED illuminates continuously to indicate a functional fault (which can be determined from the five fault LEDs), and flashes to indicate that terminal synchronization has not been achieved and that the controller is in the wait state. A yellow LED illuminates when the unit is energized, and the DC/DC converter supplying power to the system is operating, giving an on indication.

A microprocessor is used for the synchronization and BITE processes. The microprocessor, with its memory and support chips, are fabricated in CMOS to minimize power requirements. Control logic for the microprocessor includes buffers for the fault status signals. During the synchronization process, the microprocessor switches the data path from input traffic to synchronization path traffic, and also opens the output traffic path. Drivers are provided for the two WDM control lines.

The software routine flowcharts for the microprocessor are shown in FIGS. 10-15. The SFOCS executive routine performs the function of terminal supervision. The power-on reset routine provides the function of terminal reset. The microprocessor self-test routine provides the function of microprocessor fault detection. The fault priority routine provides the function of fault prioritization. The timer routine provides the function of terminal synchronization and timing. Finally, the fault check routine provides the function of system fault detection. Software routines may be encoded in a processor-based programmable read-only memory (PROM).

Although optical isolation is achieved with the system according to the invention, the canceller can be employed which provides an electronic circuit to reduce near-end cross talk. By taking a calculated portion of the transmitted signal, delaying it by a time corresponding to that of the signal passing through the transmitter, optical subsystem, bulkhead connector, and back through the optical subsystem and receiver, and then subtracting it from the received signal, the correlation coefficient is reduced to near zero. In effect, this cancels out any reflections of the transmitted signal that may be optically received by the receiver, preventing erroneous information from being processed by the receiver.

The receiver, as shown in FIG. 7, accepts the optical receive signal from the SFOCS optical subsystem and provides an electrical output signal. The receiver is comprised of a transimpedance detector-preamplifier, a video amplifier, and an output stage, as well as circuitry for fault monitoring and transmission. The transimpedance detector-preamplifier is a PIN-FET hybrid, which is comprised of a fybrid assembly containing a Gallium-Indium-Arsenide PIN Photodiode coupled to a preamplifier utilizing a Gallium Arsenide FET as the input transistor.

The optical signal is received by the PIN-FET hybrid and converted to an electrical signal by a comparator. The comparator is AC-coupled through a 6dB fixed attenuator to the first stage video amplifier of the receiver, which is controlled by the output of an AGC amplifier. The signal is then fed to a variable attenuator, which has a range of 1 to 29 dB. The attenuator output is AC-coupled to the second stage video amplifier of the receiver, the gain of which is also controlled by the AGC amplifier. The output signal from the video amplifier is AC-coupled to a low pass filter. The output of the low pass filter is applied to the output buffer amplifier which is detected and DC-amplified. This DC signal is used as the gain control for the prior stages of the receiver.

The transmitter, as shown in FIG. 7, receives fast risetime digital data traffic which consists of either synchronization data or real traffic. In the initial startup mode, synchronization data, that is, dummy data traffic, is transmitted to maintain the link until real traffic is detected. The transmitter input consists of a traffic detector and attenuator. The attenuator output is coupled to an amplifier which drives a power FET circuit containing one of two LEDs. The choice of LED is made by the controller during synchronization. Peak detectors are used to produce a constant peak current LED drive and maintain the bias LED drive current. Peak drive current is monitored to determine optical transmission fault. The LEDs terminate in an integral fiber optic pigtail.

Figure 8:
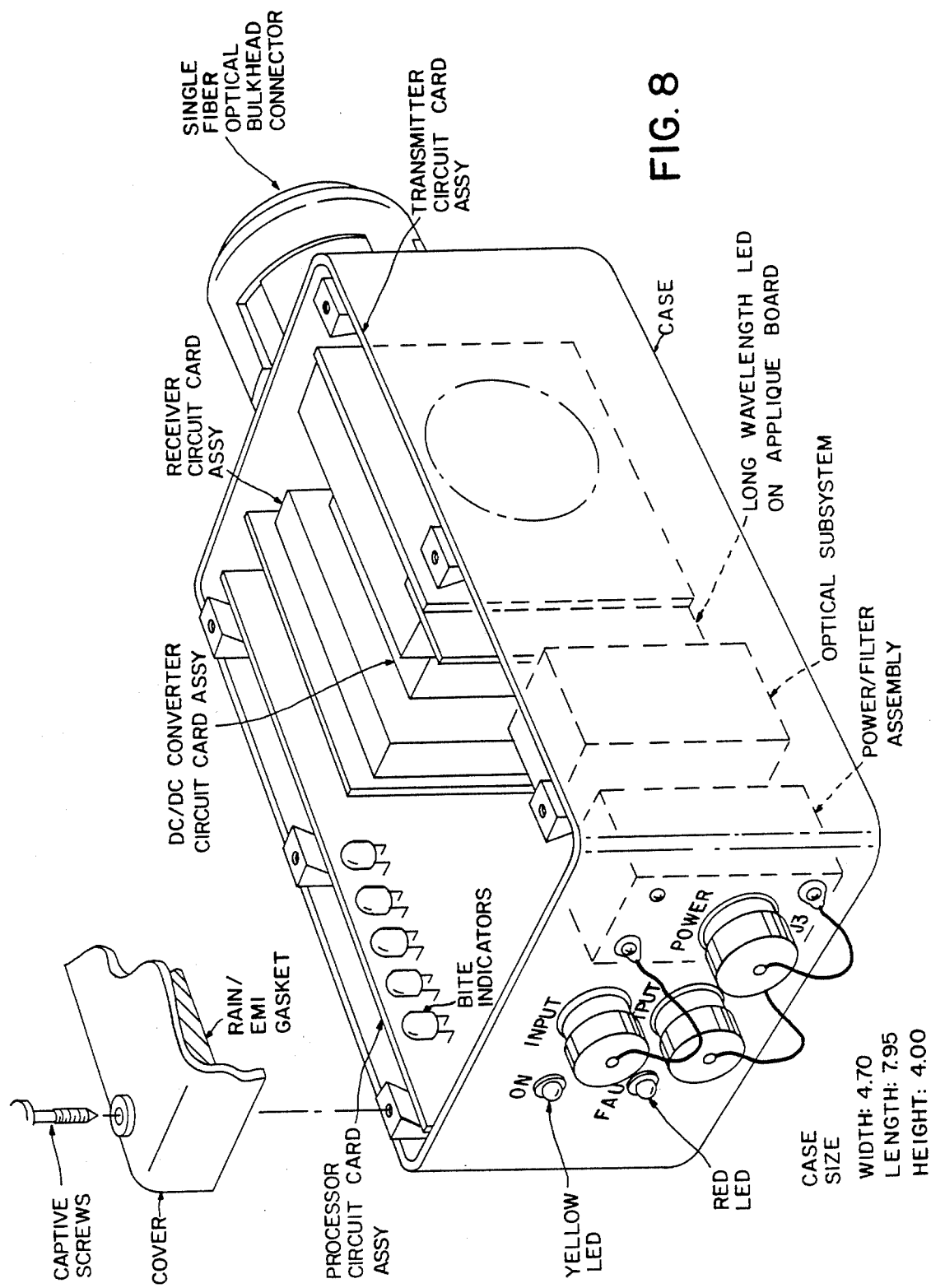
FIG. 8 shows the SFOCS terminal according to the invention.

The SFOCS system, except for the cable assembly, is packaged within the SFOCS terminal, shown in FIG. 8, which contains the optical subsystem, controller/BITE, canceller, transmitter, receiver, DC/DC converter, and the equipment case.

The relationship between the various circuit card assemblies and connectors is illustrated by the terminal interconnect diagram, shown as FIG. 9. Total weight of the SFOCS terminal is 4.4 pounds.

A system according to the invention can transmit and receive digital data at a rate of 1.0 megabit per second (Mbps) to 20.206933 Mbps (non-return to zero (NRZ), 3% unbalanced) or a low rate down to Manchester-encoded 500 kilobits per seconds (Kbps) to 10.5 Mbps, with the bit error rate equal to $10^{-9}$. Such a system can interoperate with an MD-1026 Digital Data Group Modem including orderwire (digital, digital voice, or maintenance) and can accept high level data without an orderwire. Regular BNC connectors can be used for data interconnections, and power can be accepted through a twinaxial connector.

While the present invention has been described in connection with a preferred embodiment thereof, it is to be understood that additional embodiments, modifications, and applications which will become obvious to those skilled in the art are included within the spirit and scope of the invention as set forth by the claims appended hereto.

TABLE 1
CABLE ATTENUATION DATA (dB/km)

| | −46° C. | +25° C. | +71° C. |
|---|---|---|---|
| 1.25 MICRON WAVELENGTH | 1.23 | 0.94 | 1.26 |
| 1.50 MICRON WAVELENGTH | 1.57 | 1.36 | 1.18 |

TABLE 2

| TEMPERATURE | −46° C. | +25° C. | +71° C. |
|---|---|---|---|
| AVE. TRANSMITTER POWER (dBM) | −12.80 | −16.50 | −18.70 |
| RECEIVER SENSITIVITY (dBM) | −48.60 | 48.10 | 46.10 |
| AVAILABLE SYSTEM ATTENUATION (dB) | 35.80 | 31.60 | 27.40 |
| CABLE LOSS (dB) | 19.74 | 17.42 | 19.98 |
| OPTICAL SUBSYSTEM LOSS (dB) | 5.60 | 5.80 | 6.90 |
| TOTAL SYSTEM LOSS (dB) | 25.34 | 23.22 | 26.88 |
| SYSTEM MARGIN (dB) | 10.46 | 8.38 | 0.52 |
| CABLE LOSS (dB/KM) | 1.23 | 0.94 | 1.26 |
| SINGLE PAIR CONNECTOR LOSS (dB) | 1.10 | 1.10 | 1.10 |

TABLE 3

| TEMPERATURE | −46° C. | +25° C. | +71° C. |
|---|---|---|---|
| AVE. TRANSMITTER POWER (dB) | −12.00 | −18.20 | −21.20 |
| RECEIVER SENSITIVITY (dBM) | −48.60 | −48.10 | −46.70 |
| AVAILABLE SYSTEM ATTENUATION (dB) | 36.60 | 29.90 | 25.50 |
| CABLE LOSS (dB) | 22.46 | 20.78 | 19.34 |
| OPTICAL SUBSYSTEM LOSS (dB) | 5.60 | 5.80 | 6.00 |
| TOTAL SYSTEM LOSS (dB) | 28.06 | 26.58 | 25.34 |
| SYSTEM MARGIN | 8.54 | 3.32 | 0.16 |
| CABLE LOSS (dB/KM) | 1.57 | 1.36 | 1.18 |
| SINGLE PAIR CONNECTOR LOSS (dB) | 1.10 | 1.10 | 1.10 |

We claim:

1. An optical communication terminal, comprising:
 a first electro-optical transmitter, transmitting an optical signal at a first optical wavelength,
 a second electro-optical transmitter, transmitting an optical signal at a second optical wavelength,
 an electro-optical receiver, receiving at both of said first and second optical wavelengths,
 a single fiber cable,
 a first coupler, coupled to said receiver and to said single fiber cable, and including
  first and second filter means, and
  means, connected to said first and second filter means, for switchably inserting one of said filter means in an optical path between said receiver and said single fiber cable,
 a second coupler, coupled to each of said transmitters, for coupling optical signals from said transmitters to said first coupler, and
 control means, coupled to said first coupler, for controlling said first coupler,
 wherein said first coupler couples a selected one of said transmitted optical signals of said first and second wavelengths to said single fiber cable for transmission thereover, while coupling optical signals of the other of said first and second wavelengths received after transmission to said terminal over said single fiber cable to said receiver, and wherein selection of optical signal wavelength for transmission and reception is controlled by said control means.

2. An optical communication terminal according to claim 1, wherein said first coupler further comprises:
 a first graded index rod lens, coupled to said single fiber cable and said second coupler at one end and to said inserting means at its other end, and
 a second graded index rod lens, coupled to said receiver at one end and to said inserting means at its other end.

3. An optical communication terminal according to claim 1, wherein each of said filter means comprises a dichroic filter.

4. An optical communication terminal according to claim 1, wherein each of said electro-optical transmitters comprises a light emitting diode.

5. An optical communication terminal according to claim 1, wherein said control means comprises a microprocessor.

6. An optical communication terminal according to claim 1, wherein said electro-optical receiver comprises a PIN-FET hybrid detector.

7. An optical communication terminal according to claim 6, wherein said electro-optical receiver further comprises:
 a video amplifier, coupled to the output of said hybrid detector, and
 an output stage, coupled to said video amplifier, to provide a received output traffic signal.

* * * * *